Patented Jan. 13, 1942

2,270,174

UNITED STATES PATENT OFFICE 2,270,174

METHOD FOR RECOVERING SULPHUR FROM WASTE LIQUORS CONTAINING SULPHIDIC SODIUM COMPOUNDS

Johann Joseph Stoeckly, Teltow, and Elmar Profft, Berlin-Lichterfelde, Germany, assignors to North American Rayon Corporation, New York, N. Y., a corporation of Delaware No Drawing. Application September 15, 1939, Serial No. 295,158. In Germany September 29, 1938

2 Claims. (Cl. 23—224)

This invention relates to improvements in methods for recovering sulphur from waste industrial liquors.

More particularly it relates to a method for recovering sulphur from waste liquors of the viscose artificial silk industry, especially waste desulphurizing baths and liquors containing various sulphides of sodium and cellulose decomposition products.

The recovery of sulphur from waste industrial liquors containing sulphides of sodium, especially from desulphurizing baths and the like, of the type resulting from the manufacture of viscose artificial silk and which contain decomposition products of cellulose, is a difficult matter, largely because the sulphur when precipitated from the sulphidic compounds by prior art methods is obtained in such finely colloidal condition that it is hardly possible to make it settle out within any commercially economical space of time or even to remove it by filtration. The cellulose decomposition products such as hemicellulose and even glucose act as protective colloids in this case.

It is an object of the present invention to convert the sulphur of colloidal sulphur suspensions constituting such liquors into a form that is amenable to settling and filtration. To this end the method consists in causing the liquors to have an appreciable sodium sulphate concentration amounting to at least 35 to 40 grams of sodium sulphate per liter and a sulphuric acid concentration ranging from 15 to 25 grams (preferably about 20 grams) of sulphuric acid per liter, thereupon warming the solutions and then allowing them to stand for a number of hours while cooling, e. g. for 10 to 20 hours. A large portion of the sulphur settles out during this period. The solution which is siphoned off, if not clear, may be separated from the residual sulphur in suitable known manner by filtration. To illustrate the invention, several non-limiting embodimental examples of its application are given below.

Example 1

Waste bath liquors from the viscose artificial silk industry containing sulphur and having, for example, the following composition:

| | Grams per liter |
|---|---|
| Free NaOH | .1 |
| $Na_2CO_3$ | 2.5 |
| $Na_2S_2O_3$ | 1.5 |
| Sodium sulphides | 3.5 |
| Hemicellulose | 5. | are treated with 25 grams of sodium sulphate per liter, whereupon so much sulphuric acid is added until a distinctly acid reaction is produced. The decomposition of the sodium compounds serves to raise the total content of sodium sulphate to the desired amount. The hydrogen sulphide set free dissolves in the liquid, the total volume thereof being sufficient to hold the hydrogen sulphide in solution for a time. Sulphur dioxide is then passed in until the dissolved hydrogen sulphide is decomposed. This stage is evidenced by the fact that the solution smells faintly of sulphur dioxide. Next, the sulphuric acid content is supplemented until 20 grams of sulphuric acid per liter can be determined by titration. Finally the entire mass of liquid is heated to 80° C. and then allowed to stand for 15 hours during which time the liquid is allowed to cool down. The greater portion of the suspended material settles out. The supernatant liquid is siphoned off from the sulphur slurry and filtered.

Example 2

The same type of sulphidic liquor described under Example 1 is treated at 70° C. by passing air therethrough until a sample, when acidified, no longer evolves hydrogen sulphide. Thereupon the solution is treated with 25 grams of sodium sulphate per liter and subsequently acidified with sulphuric acid until 20 grams of sulphuric acid per liter can be determined by titration. The solution is then heated to 80° and allowed to stand for 15 hours during which time it is allowed to cool down. The greater portion of the sulphur settles out. The supernatant liquid is siphoned off, the sulphur slurry which contains hemicellulose is worked up separately and the solution, which is always somewhat turbid, is filtered.

Modifications of this invention will readily be recognized by those skilled in the art, and it is intended to cover all modifications coming within the scope of the appended claims.

What is claimed is:

1. The method of recovering sulphur from waste liquors of the viscose artificial silk industry which comprises adding sodium sulphate and sulphuric acid to a waste liquor containing sodium sulphides and cellulose decomposition products to form colloidal sulphur therein, raising the sodium sulphate content of said liquor to 35 to 40 grams per liter and the sulphuric acid content thereof to 15 to 25 grams per liter, heating said liquor to a temperature of about 80° C. and then while cooling allowing the liquor to stand to precipitate the sulphur contained therein in a condition amenable to rapid settling and filtration.

2. The method of recovering sulphur from waste liquors of the viscose artificial silk industry which comprises adding sodium sulphate and sulphuric acid to a waste liquor containing sodium sulphides and cellulose decomposition products to form colloidal sulphur therein, raising the sodium sulphate content of said liquor to 35 to 40 grams per liter and the sulphuric acid content thereof to 20 grams per liter, heating said liquor to a temperature of about 80° C. and then while cooling allowing the liquor to stand to precipitate the sulphur contained therein in a condition amenable to rapid settling and filtration.

JOHANN JOSEPH STOECKLY.
ELMAR PROFFT.